Jan. 9, 1968   T. R. WAITE ET AL   3,363,104
DETECTION SYSTEM FOR COHERENT LIGHT BEAMS
Filed Oct. 1, 1965                                          4 Sheets-Sheet 1

INVENTORS
THOMAS R. WAITE
RICHARD A. GUDMUNDSEN
BY
ATTORNEY

Jan. 9, 1968        T. R. WAITE ET AL        3,363,104

DETECTION SYSTEM FOR COHERENT LIGHT BEAMS

Filed Oct. 1, 1965        4 Sheets-Sheet 3

INVENTORS
THOMAS R. WAITE
RICHARD A. GUDMUNDSEN
BY
*Robert G. Roger*

ATTORNEY

United States Patent Office 3,363,104
Patented Jan. 9, 1968

3,363,104
DETECTION SYSTEM FOR COHERENT LIGHT BEAMS
Thomas R. Waite, Lancaster, and Richard A. Gudmundsen, Santa Ana, Calif., assignors to North American Aviation, Inc.
Filed Oct. 1, 1965, Ser. No. 491,952
3 Claims. (Cl. 250—199)

ABSTRACT OF THE DISCLOSURE

An optical heterodyne detection system wherein a reference light source is combined with a modulated coherent carrier beam to produce a moving fringe pattern. A plurality of light responsive detector elements are interconnected to form two groups of alternate elements, each group receiving light from alternate fringes of the pattern. The outputs of each group of detectors then are combined to cancel out noise resultant from incident incoherent light and to provide a signal indicative of the modulation on said coherent carrier beam.

---

This invention relates to a system for heterodyning and accurately detecting information transmitted by a modulated coherent signal carrying light beam.

The development of lasers has made is possible to send signals, make measurements and transmit information by means of very high frequency coherent electromagnetic rays in and near the optical range. The detection of such coherent light is made more difficult because of the presence of very extensive background light from the sun and other sources. Even after detection, it is often difficult or impossible to extract information carried by the light wave by amplitude, frequency, phase or polarization modulation because of signal strength or the light noise interference.

The present state of the optical art provides many systems of detecting light and measuring its intensity, and in some cases its frequency. Most of these systems, however, are not able to distinguish between coherent and incoherent light. The systems which have the capability of distinguishing coherent light are often troubled by the presence of spurious background light, coherent or otherwise, which appears as noise. Although techniques of heterodyning to an intermediate frequency are available, their effectiveness is impaired by the spurious light, including noise light generated by the local oscillator and the exacting alignment problems caused by interference effects.

Information may be carried on a coherent light wave in any of several ways. The mere presence or absence of the coherent beam is itself information. Pulsed beams can carry information one "bit" at a time. More generally, a continuous beam of light may be characteristically modulated by any one of the following well-known methods to carry information: (1) amplitude, (2) frequency, (3) phase, and (4) direction of polarization of electric vector. However, in each case noise elimination is the important consideration.

The information carried by the modulated carrier beam may be made to appear, in one form or another, on the intermediate frequency signal generated by heterodyning the carrier beam with a reference coherent beam of light. Thus, if the amplitude, frequency, phase and polarization of the reference beam are known and controlled, the amplitude, frequency and phase of the characteristically modulated carrier beam will appear on the intermediate frequency signal as amplitude, frequency or phase modulation, respectively. Information carried by the modulation of the direction of polarization of the electric vector of the carrier light beam can be detected as amplitude or phase modulation of the intermediate frequency carrier by heterodyning with a plane polarized reference beam. If two or more characteristics of the carrier beam are modulated simultaneously some care must be taken to place the information on the intermediate frequency signal in a usable form.

It is a known phenomena that the intersection at an angle $\theta$ of two beams of parallel monochromatic light of the same wavelength ($\lambda$) produces parallel light and dark fringes in the region of the intersection. If one of the beams has a frequency ($f_2$) slightly different from that of the other ($f_1$), the alternately light and dark fringes appear to move or change intensity in a plane approximately normal to the intersecting beams at a rate proportional to the difference between the frequencies. The present invention utilizes this phenomena to provide a method for accurately heterodyning, or homodyning, a modulated coherent signal carrier light beam with a reference coherent light beam representing a local oscillator signal and subsequently extracting the information signal carried by the modulated carrier beam. The extracted information appears as a modulated intermediate frequency signal.

Where amplitude modulation of the light beam is used, instead of frequency modulation which results in the fringes appearing to move, the phenomena is more exactly described as a change in intensity of the fringes. For example, adjacent fringes change in intensities at a rate dependent on the amount of amplitude modulation. Phase and polarization modulation produce a fringe pattern similar to a frequency modulated signal beam. In all cases, the changes in a fringe pattern represent the modulation of the intersecting light beam and provide a method for detecting the signal represented by the modulation of the carrier beam.

The present system overcomes many of the limitations of the prior art and provides a system for the detection of information transmitted by modulated light beams without interference from many types of spurious background light.

The present invention is directed to a system for generating signals responsive to the changes in the fringe pattern resulting from the interaction of a modulated carrier light beam and a reference light beam where the changes are proportional to the modulating information signal. The system utilizes a detector means which includes means for measuring the intensities of alternate fringes to produce a signal having a fundamental component proportional to the intensity of alternate fringes. The signal includes an additional component due to the spurious background light and local oscillator noise. The detector means also includes means for measuring the light intensity of the fringes adjacent to the alternate fringes which produces a signal having a fundamental component proportional to the intensity of the adjacent fringes. This signal also includes the spurious component resulting from the spurious background light and local oscillator noise. These two signals are then combined to produce an output signal proportional to the information signal while essentially eliminating the spurious components.

The fringe pattern, resulting from the interaction of the two light beams when $f_1 = f_2$, consists of alternating light and dark fringes.

The two signals produced by measuring the intensities of the two sets of selected fringes, resulting from interaction of the light beams, are 180° out of phase. The component parts produced by noise light are superimposed on the out of phase signals but are in phase with each other. Thus, the signals which are a measure of the modulation of the light beam are 180° out of phase and the superimposed noise signals are in phase.

Means are provided for subtracting the two signals such that the out of phase components are increased in magnitude and the superimposed in phase components are substantially reduced. As a result, the intensity of the signal representing the modulation information (for example, in the case of frequency modulation, the signal with a frequency the same as the difference frequency between the two intersecting beams) is increased and the signal representing the spurious noise is reduced. The difference frequency signal has the same modulation as the carrier beam so that the resulting signal represents the transmitted information and is substantially noise-free.

The detection means might be modified slightly by dividing the elements of one detector or both for determining the sign of the frequency difference.

Therefore, it is an object of this invention to provide a system for detecting a modulating signal carried by a coherent light beam by generating an interference pattern through the uses of a reference coherent light beam.

It is another object of this invention to provide a system heterodyning two light beams and combining electrical signals representing characteristics of said beams to reduce noise and increase the magnitude of an information signal carried by one of the light beams.

It is still another object of this invention to provide a light beam heterodyning system in which a modulated light beam is detected essentially free of the effects of spurious light.

It is a further object of the present invention to convert a modulated coherent light beam by heterodyning with a reference light beam and detecting the motion of the fringes or the intensity of the fringes to obtain the information signal carried by the modulated beam.

These and other objects of the invention will become more apparent from the following description taken in connection with the accompanying drawings of which:

Figure 1:
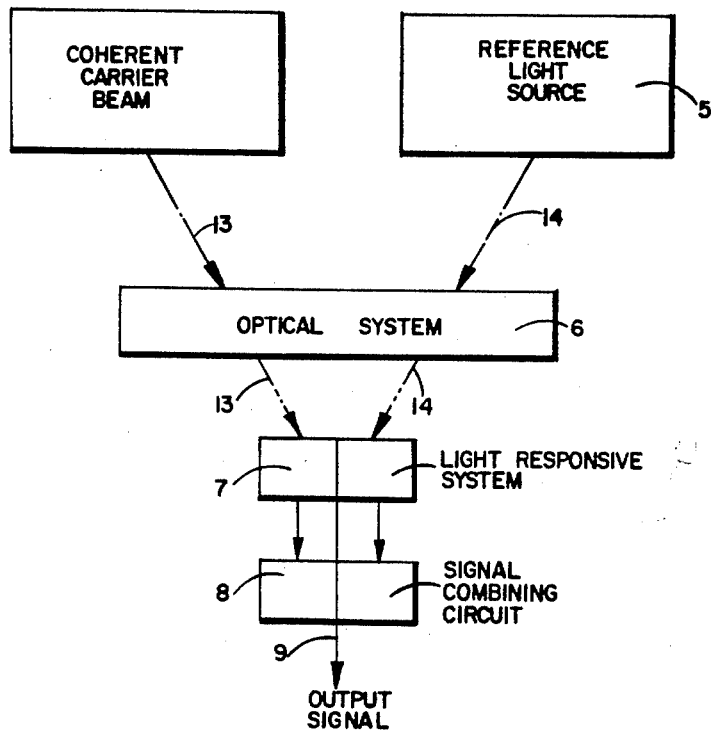
FIGURE 1 is a schematic diagram of the system of the present invention.

FIGURE 1 shows the schematic arrangement of the present invention which includes a source of coherent reference light 5, having appropriate means for selectively varying the amplitude, frequency, phase or polarization of the reference beam represented at 14, a characteristically modulated coherent carrier light beam, represented at 13, and an optical system 6 for controlling the positioning and relative angle between beams 13 and 14. The optical system 6, of suitable lens or lens system which causes the two light beams 13 and 14 to intersect at a small angle and create an interference pattern by the interaction of the light beams on the surface of light responsive means 7 which converts the modulated beam 13 into a modulated interference fringe pattern. The detector system 7 is positioned in a preselected plane in the paths of beams 13 and 14 and generates a pair of signals connected to the signal combining circuit 8. Circuit 8 generates an output signal at 9 representing the information signal of the modulated carrier beam 13. The cooperation of the various systems of FIGURE 1 is more apparent from the detailed schematic of FIGURE 2 which shows the detector system 7 and signal combining circuit 8 in more detail.

Figure 2:
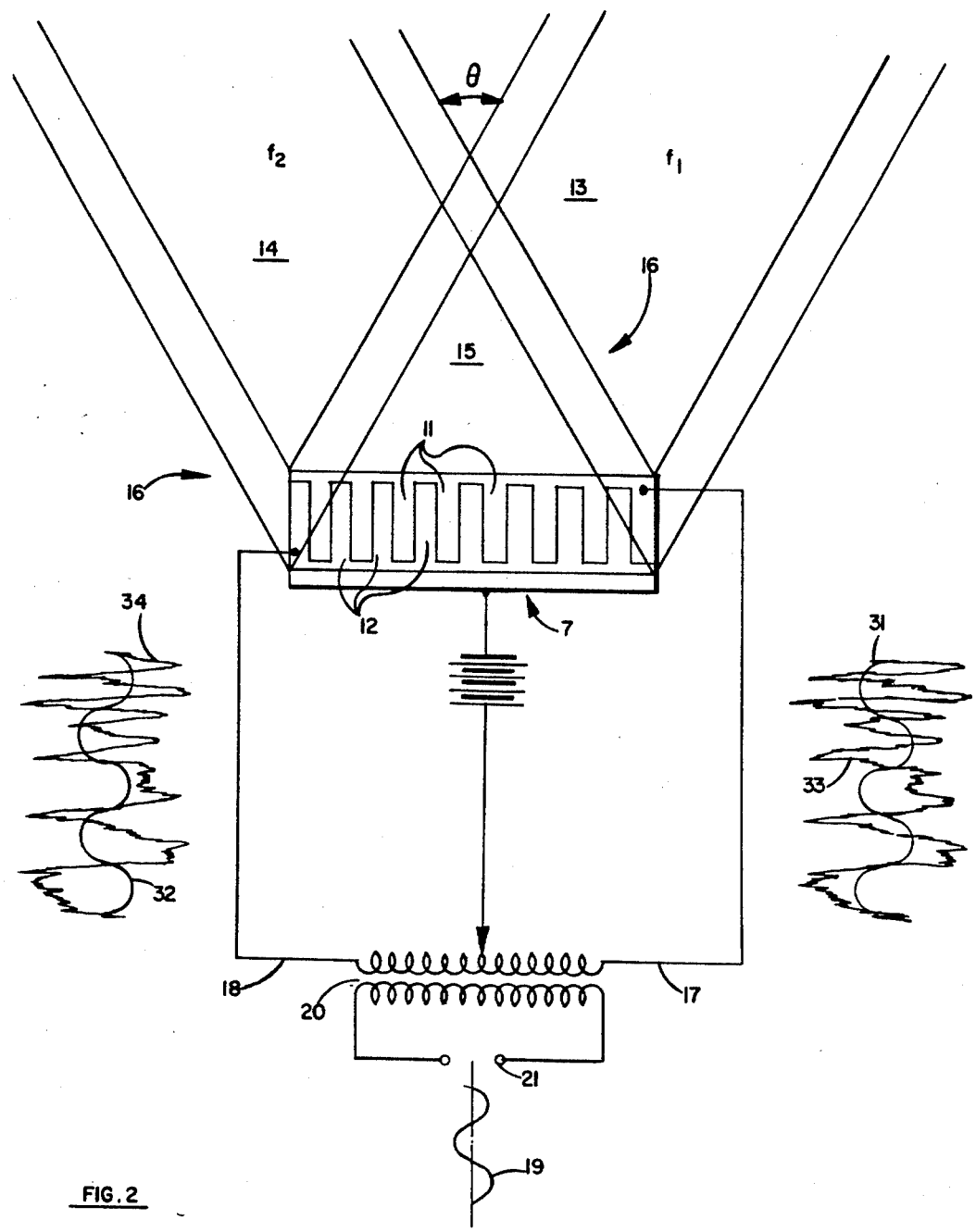
FIGURE 2 is a detailed schematic diagram of the detectors and signal combining circuit of FIGURE 1.

Referring now to FIGURE 2, the system of the present invention includes a light responsive means 7 which includes light detection elements 11 for measuring the intensity of alternate fringes of a light interference pattern, and substantially similar light detection elements 12 for measuring changes in intensity of fringes adjacent to the adjacent to the alternate fringes of the interference pattern.

Figure 3:
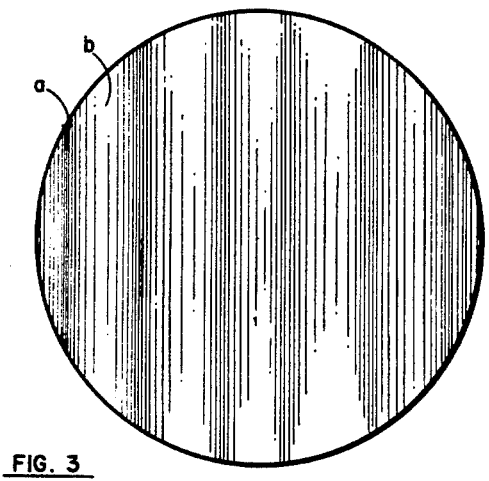
FIGURE 3 is an illustration of a fringe pattern impinging on the detector means.

The interference pattern is produced by the intersection of light beams 13 and 14. In the preferred embodiment of FIGURE 2 these beams represent a modulated coherent light beam carrier signal 13 having a frequency $f_1$, and a coherent light beam reference signal 14 having a substantially fixed frequency $f_2$ or a controlled variable frequency $f_2$. Thus, for this embodiment it is assumed that the carrier beam has been frequency modulated. The beams 13 and 14 are directed by optical system 6 to intersect at an angle $\theta$ which is exaggerated in FIGURE 2 for clarity of description. In a preferred application the angle $\theta$ is small, e.g., one to five degrees, so that the area of overlap between the two intersecting light beams is larger. In order to provide proper fringe size and placement on the detector means 11 and 12 the optical system 6 may be provided with components to focus the beams and to change the size of the interference pattern.

Where the two beams 13 and 14 intersect, area 15, a fringe pattern (see FIGURE 3) of alternate dark and light fringes, $a$ and $b$, of a light interference pattern are produced. For the embodiment shown the fringes have a spacing $\lambda/(2 \sin \theta/2)$.

Noise is illustrated in FIGURE 2 by spurious light, represented as 16, impinging at random on the surface of the light responsive means 7. Since the noise light is random and spurious, it does not interact with the light beams 13 and 14 to produce a fringe pattern of a size to fit the detector grid pattern spacing. Signals resulting from the spurious light and produced by light responsive means 7, in response to the spurious light, occur without regard to the regular preselected spacing of detector elements 11 and 12. As a result, signals representing spurious light are generated in phase by both detector means 11 and 12.

In the frequency modulated case of the preferred embodiment the fringes change in intensity or move normal to the pattern at a rate proportional to the difference in frequencies between light beam 13 and light beam 14, i.e., proportional to the information signal with which the carrier beam is being modulated. For the embodiment shown, the detector elements 11 and 12 are comprised of photodiodes having spaced interlocking surface elements which generate an electrical signal when light impinges on its surface. Therefore, as the fringes move across the surface of the light responsive means 7 signals are generated as shown in FIGURE 2.

The surface elements of each detector 11 and 12 are designed or otherwise placed in a pattern so that a bright or dark fringe appears on each element. When $f_1=f_2$ the intensity varies in time but in such a way that the intensity on detector elements 11 decrease as the intensity on detector elements 12 increase and vice versa. As a result the components of the signals produced by the photodiodes of means 11 and 12 representing the information signal are 180° out of phase, while the component of the signal produced by the spurious noise light 16 are in phase. The out of phase signal components are represented by signals 31 and 32 and the in phase noise or spurious light components are represented by the random occurring portions 33 and 34.

The detecting means 11 and 12 are each connected through leads 17 and 18, respectively, to signal combining means 20. For the embodiment shown the combining means 20 comprises a subtracting circuit and includes a simple transformer having the opposite ends of its summary winding connected to leads 17 and 18 so that two signals from means 11 and 12 will be subtracted and an information signal of greater magnitude will result, while the in phase noise is substantially reduced. The primary winding of transformer 20 is provided with a movable centertap connected through a voultage source to ground so that small differences in response characteristics of detectors 11 and 12 can be balanced. The output signal 19 at terminal 21 of subtraction means 20 is substantially free of the noise and represents the information transmitted on the modulated light beam 13.

For the system described herein, it may be important to know the sign as well as the magnitude of any frequency or phase difference between a carrier beam and a reference beam. The sign can be determined by detecting the apparent motion of the interference fringes. For example, the fringes will appear to move in one direction if the frequency of the carrier beam is greater than the frequency of the reference beam and in the reverse direction if the frequency of the reference beam is greater than the frequency of the carrier beam. The sign of the frequency difference can be determined by making a minor modification to one of the detector means.

Figure 4A:
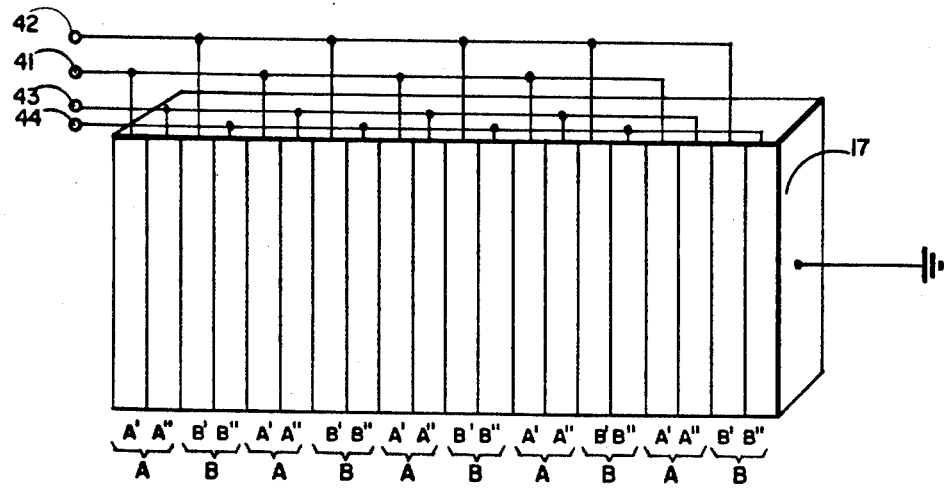
FIGURE 4a is an illustration of a modified detector for determining the sign of the frequency.
Figure 4B:
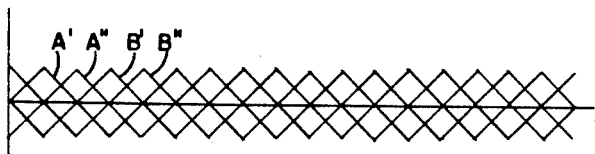
FIGURE 4b is a representation of curves produced from the elements of the modified detector.
Figure 4C:
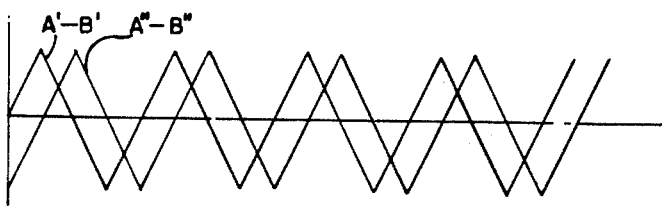
FIGURE 4c is a representation of the signals after transaction.
Figure 4:
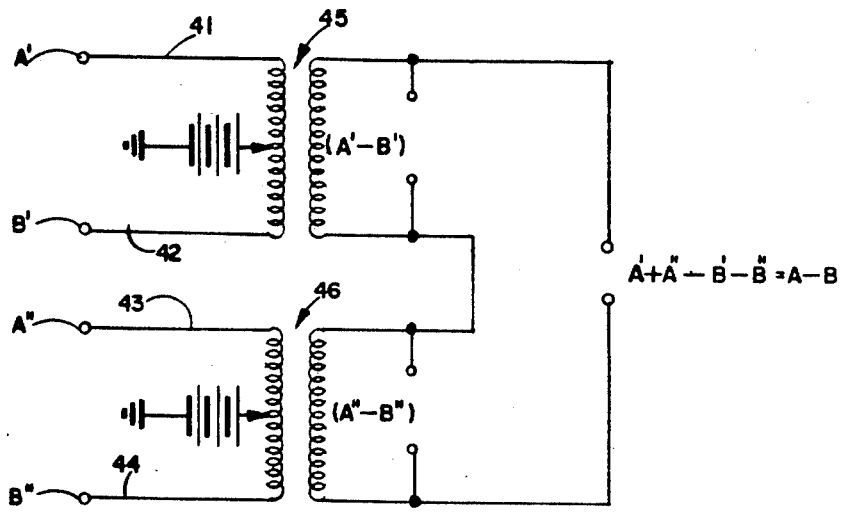
FIGURE 4 is an illustration of transformer means for combining the signals from the light detector means.

Referring now to FIGURES 4 and 4a, detector means 11 and 12 are modified by dividing the detector elements comprising means 11 and 12 into equal parts forming double detector elements designated as A', A", B' and B". Conductor 41 connects A' detector elements via conductor 41 to one half of transformer 45. Conductor 42 connects detector elements B' to the other half of the transformer. A" detector elements are connected via conductor 43 to one half of transformer 46. Conductor 44 connects conductor elements B" to the other half of the transformer.

Curves representing signals produced from the elements of the detector means are shown and labelled in FIGURE 4b.

The curves shown in FIGURE 4c represent the subtraction of alternate signals for producing noise free signals proportional to the information signal. By viewing the signals by an oscilloscope or other devices known in the art, it can be determined that the signal designated as $(A'-B')$ leads the signal $(A''-B'')$ by 90 degrees. The lead characteristic indicates that the fringes are moving from left to right and that the beam impinging upon the detector means from the left has the highest frequency. The inverse is true for the opposite condition.

Figure 4D:
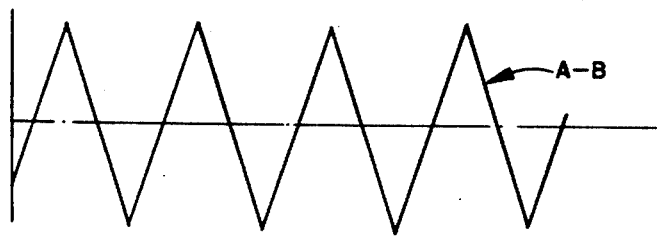
FIGURE 4d is a representation of the combined output signals.

Equations illustrating the transformer action first subtracting and then adding the signals is shown as follows:

Transformer 45 signal: $A'-B'$
Transformer 46 signal: $A''-B''$
Combined output: $A'+A''-B'-B''=A-B$ The combined output A-B, shown in FIGURE 4d is in effect the same signal shown in FIGURE 2 as output signal 19.

Figure 4E:
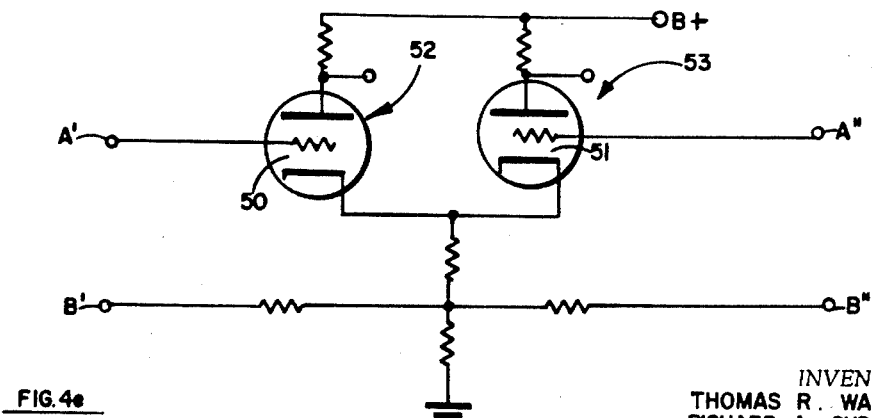
FIGURE 4e is a representation of a common cathode circuit which may be used to detect the signals shown at the output of the detector.

Referring now to FIGURE 4e wherein is shown a common cathode circuit comprising triodes 50, 51 having grid connections to the output side of transformers 45 and 46 at the points indicated. The circuit includes output 52 and 53 for viewing the curves shown in FIGURE 4c, for example by an oscilloscope. Other means may also be used to view the signals.

Detection devices other than diodes may be used to generate signals in response to intensities and changes of a fringe pattern. For example, a mirror or other reflector may be cut to permit alternate fringes to pass through transparent areas while the opposite or adjacent fringes are blocked by the reflector mirror surface. A detector placed behind the mirror would generate a signal having a frequency of $f_1-f_2$ in response to the changes in intensity from bright to dark. Another detector placed in front of the mirror would pick up the out of phase signal at the same frequency when the bright fringes were reflected. Subtraction of the two signals in a subtraction means such as the balanced output transformer shown in FIGURE 2 would produce the same results as the diode embodiment.

Another modification is the use of a double photomultiplier having a common transparent photo cathode as a detection means. On the front side of the photomultiplier cathode the photo emitting surface coating (not transparent) is designed in a configuration similar to detector element 11. The back of the photo emitting surface is a configuration similar to detector element 12 so that transmitted light activates it. Each unit of the photomultiplier includes its own accelerating secondary emitting electrodes and anodes. The two signals produced could be subtracted as indicated above.

Although for the embodiment shown, the fringe pattern (see FIGURE 3) is shown to be substantially rectangular in appearance, other fringe patterns may also be produced. For example, a circular fringe pattern commonly results from the interaction of two light beams. In that case the detection means may be designed in a circular configuration with alternate detection elements to measure the changing intensity of the fringe pattern.

In a preferred embodiment, the detection means is designed to have a light receiving area as large as the area of the fringe pattern so that maximum signal amplitude is produced. However, it is within the purview of the present invention to monitor only a small portion of fringe pattern to obtain the same result. Further, while the preferred embodiment utilizes a detection means 7 having elements conforming to the spacing pattern at the point or area where the fringe pattern is at a maximum, that is, where the maximum overlap of the two light beams occurs, the detection means could be moved within the overlapping area or even set at an angle to it, to match the elements of the detection means with the fringes of the fringe pattern thus simplifying the alignment problems. The elements of means 11 and 12 would be located so that at a specific instant of time, each element of means 11 would be receiving equal intensities of light from alternate fringes and each element of means 12 would be receiving equal intensities but out of phase with that of means 11.

Rather than using the interference fringes to create two out of phase signals on two different detectors, one might introduce a phase lag of $\pi$ radians in part of the local oscillator or reference beam which falls on the other detector. Subsequent subtraction would reduce noise and increase signal. However, this technique would require careful alignment to zero degrees intersection between the modulated carrier signal light beam 13 and local oscillator reference light beam 14.

The light detector 7 and the subtraction means 20 may be replaced by equivalent microwave devices for use with difference frequencies $(f_1-f_2)$ in the microwave range. For example, traveling wave tubes are available in which the electronic beam is generated by photo emission of electrics from a photo cathode. The tubes respond at frequencies up to many gigacycles. The microwaves generated thereby are then carried by wave guides (or coaxial cable) to a microwave Magic T (or lecher line bridge) for producing two outputs. One of the outputs is the sum of the two inputs and the other is the difference. In the system described herein, the sum would be the noise associated with the input signals and the difference would be the information signal.

It may be desirable to place variable attenuators in the waveguide between the photo element and the Magic T mixer.

In tests conducted using the embodiment of FIGURE 2, a fluorescent lamp was directed onto the surfaces of detectors 11 and 12 to produce interference noise. The noise signals were determined to be in phase on leads 17 and 18 through the signals produced by the fringe pattern from a signal and a reference beam were out of phase. The in phase noise signals were subtracted and were not detected at terminal 21. The same results were obtained when incoherent light was introduced parallel to one of the light beams 12 and 14. The two signals on 17 and 18 although the signals produced by the fringe patronic means similar to 20 but without care in balancing. The interference noise signal was reduced by more than a factor of 10, while the output signal detected at 21 was double that of the signal from one of the means 11 and 12.

It is clear from the above description that the arrangement of the present invention could be utilized merely to detect the presence of a modulated coherent light beam. Thus, the signal combining circuit 8 could be eliminated in this arrangement and the human eye, or similar device, utilized as the light responsive means. In this modification the coherent beam of unknown characteristics 13 and a reference beam of known but variable characteristics are directed to a preselected plane or screen in such a manner as to form a space modulated light interference pattern. The characteristics of the reference beam may be varied to obtain an interference pattern in which the pattern appearance and its changes represent the relative modulation between the two beams. In this manner the mere presence of a modulating signal on a coherent light beam may be detected and the complete system of FIGURE 1 then utilized to accurately generate an electrical signal representing the modulating signal of the carrier beam.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In an optical heterodyne system for detecting an information signal characteristically modulating a carrier light beam of frequency $f_1$, said system including means for generating a moving interference pattern between said carrier light beam and a coherent reference light beam of frequency $f_2$, that improvement comprising:

detector means including a plurality of interdigitated light responsive elements connected to form two groups of alternate elements, said interference pattern being positioned so that each group of detector elements receives light from alternate fringes of said pattern, in response to the intensity of said pattern, said first group generating a first signal, said second group generating a second signal 180° out of phase with said first signal, said first and second signals each having frequency $(f_2-f_1)$ and being indicative of said information signal, said signals also containing noise, and means for subtracting said first signal from said second signal, thereby cancelling said noise and permitting recovery of said information signal.

2. A system as defined in claim 1 wherein said interference pattern detector means comprises a first plurality of detector areas, a second plurality of detecting areas interspaced among alternate ones of said first plurality, said detecting areas being spaced in accordance with the distance between fringes of an interference pattern.

3. The detector recited in claim 2 wherein said first plurality of detecting areas is divided into a first and second portion and said second plurality of areas is divided into a third and fourth portion, means for connecting said first and third portions and said second and fourth portions.

References Cited

UNITED STATES PATENTS

| | | | |
|---|---|---|---|
| 2,886,718 | 5/1959 | Shepherd et al. | 88—14 |
| 3,153,111 | 10/1964 | Barber et al. | 250—237 |
| 3,175,088 | 3/1965 | Herriott | 250—199 |
| 3,175,093 | 3/1965 | De Lang | 250—237 |
| 3,230,380 | 1/1966 | Cooke | 250—237 |
| 3,258,597 | 6/1066 | Forrester | 250—199 |

FOREIGN PATENTS 953,723    4/1964    Great Britain.

ROBERT L. GRIFFIN, *Primary Examiner.*

JOHN W. CALDWELL, *Examiner.*

A. J. MAYER, *Assistant Examiner.*